United States Patent
Iustin

(10) Patent No.: US 11,987,080 B2
(45) Date of Patent: May 21, 2024

(54) PORTABLE ELECTRONIC DEVICE AND METHOD THEREIN FOR LOCATING TIRE SENSORS ON A VEHICLE

(71) Applicant: VOLVO TRUCK CORPORATION, Gothenburg (SE)

(72) Inventor: Roman Iustin, Mölnlycke (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 97 days.

(21) Appl. No.: 17/664,296

(22) Filed: May 20, 2022

(65) Prior Publication Data
US 2022/0396104 A1 Dec. 15, 2022

(30) Foreign Application Priority Data
Jun. 11, 2021 (EP) .................................... 21179107

(51) Int. Cl.
*B60C 23/04* (2006.01)
*G06T 7/70* (2017.01)
(Continued)

(52) U.S. Cl.
CPC ...... *B60C 23/0416* (2013.01); *B60C 23/0447* (2013.01); *B60C 23/0472* (2013.01);
(Continued)

(58) Field of Classification Search
CPC ............ B60C 23/0416; B60C 23/0447; B60C 23/0472; B60C 23/0479; B60C 2200/06; B60C 23/0471; G06T 7/70; G06T 2207/30252; H04W 4/023; H04W 4/025; H04W 4/40; H04W 4/80
(Continued)

(56) References Cited

U.S. PATENT DOCUMENTS 7,990,257 B2 * 8/2011 Loehndorf .......... B60C 23/0416
340/447
8,903,602 B2 12/2014 Bailie et al.
(Continued)

FOREIGN PATENT DOCUMENTS

GB 2567888 A * 5/2019 ........... B60C 23/007
WO 2013063061 A1 5/2013

OTHER PUBLICATIONS

Extended European Search Report in corresponding European Application No. 21179107.4 dated Sep. 29, 2021 (5 pages).

*Primary Examiner* — Eric Blount
(74) *Attorney, Agent, or Firm* — Venable LLP; Jeffri A. Kaminski

(57) ABSTRACT

A portable electronic device and method therein for locating tire sensors on a vehicle is provided. The portable electronic device comprises a camera and RFID circuitry. The portable electronic device determines the tire location of each tire on the vehicle using image recognition on image data from the camera. The portable electronic device also detects one or more tire sensors of each tire via the RFID circuitry as the portable electronic device sequentially guides a user of the portable electronic device via a user interface to motion the portable electronic device in proximity of each tire at each determined tire location. Further, the portable electronic device also identifies each of the one or more detected tire sensors on the vehicle.

14 Claims, 3 Drawing Sheets

(51) Int. Cl.
  *H04W 4/02* (2018.01)
  *H04W 4/40* (2018.01)
  *H04W 4/80* (2018.01)

(52) U.S. Cl.
  CPC ............ *B60C 23/0479* (2013.01); *G06T 7/70* (2017.01); *H04W 4/023* (2013.01); *H04W 4/025* (2013.01); *H04W 4/40* (2018.02); *H04W 4/80* (2018.02); *B60C 2200/06* (2013.01); *G06T 2207/30252* (2013.01)

(58) Field of Classification Search
  USPC ........................................................ 340/447
  See application file for complete search history.

(56) References Cited

U.S. PATENT DOCUMENTS

| | | | |
|---|---|---|---|
| 9,050,862 B2 * | 6/2015 | Mouchet | B60C 23/0472 |
| 9,457,627 B1 * | 10/2016 | Keller | B64C 25/34 |
| 10,486,476 B2 * | 11/2019 | Patel | B60C 23/0405 |
| 10,583,699 B2 | 3/2020 | Hassani et al. | |
| 2002/0130771 A1 * | 9/2002 | Osborne | B60C 23/008 340/441 |
| 2008/0164988 A1 * | 7/2008 | DeKeuster | B60C 23/0408 340/442 |
| 2016/0325592 A1 | 11/2016 | Tomakidi | |
| 2019/0230615 A1 | 7/2019 | Werner et al. | |

* cited by examiner

PORTABLE ELECTRONIC DEVICE AND METHOD THEREIN FOR LOCATING TIRE SENSORS ON A VEHICLE

TECHNICAL FIELD

Embodiments herein relate in general to localization of tire sensors on a vehicle. In particular, embodiments herein relate to a portable electronic device and a method therein for locating tire sensors on a vehicle. Also, the embodiments herein also relate to a computer program product and a carrier.

BACKGROUND

In vehicles today, in particular heavy-duty vehicles such as semi-trailer vehicles or trucks for cargo transport, one or more central electronic control units, ECUs, may be implemented on-board the vehicle in order to read and collect sensor readings from various different types of sensors on-board the vehicle. These sensor readings may, for example, comprise tire pressures, temperatures and identities of tire, or tire sensors located in or on the tires, of the vehicle. These types of systems are conventionally referred to a Tire Pressure Monitoring Systems, TPMS, or Tire Health Systems, THS. These systems normally employ Radio Frequency Identification, RFID, for their sensors.

In a TPMS/THS system, each tire may have one or more integrated tire sensors. Each tire sensor has unique identity, ID. During mounting of the tires, or re-mounting of the tires due to e.g. tire rotation, the TPMS/THS system needs to be informed about exactly in which tire position on the vehicle each tire sensor is located. This is order for the ECU to have information about where on the vehicle each specific tire sensor and tire is located.

One way to determine a tire's tire position, or its tire sensor positions, on the vehicle is to manually determine the tire or tire sensor positions and input this into the TPMS/THS system. Normally, this manual procedure is performed by selecting a specific tire position via a display interface in which all tire positions are shown, and then to hit the tire at the selected position with a mallet or hammer in order to create a small pressure variation inside the tire. The small pressure variation will then be sensed inside the tire by the tire sensor that sends a signal towards central ECUs of TPMS/THS system. Here, the ID of the tire sensor may be modulated or embedded into the signal. However, due to the human factor, this manual configuration might be prone to errors.

Another way to determine tire position on the vehicle for a tire sensor is described in U.S. Pat. No. 8,903,602 B2. U.S. Pat. No. 8,903,602 B2 describe an auto-location method that requires readings from other sensors on the vehicle, such as, for example, Automatic Brake System, ABS, sensors. Additionally, it also requires placing transmission extenders on each side of the chassis of the vehicle in order to locate form which side or tire the signal was actually sent. Unfortunately, this method requires additional hardware to be installed on the vehicle, such as, TPMS/THS transmission extenders, ABS sensors and/or other vehicle sensors.

SUMMARY

It is an object of embodiments herein to provide a portable electronic device and method therein, along with computer program products and systems, for locating tire sensors on a vehicle that seeks to mitigate, alleviate, or eliminate all or at least some of the above-discussed drawbacks of presently known solutions.

According to a first aspect of embodiments herein, the object is achieved by a method for locating tire sensors on a vehicle. The portable electronic device comprises a camera and Radio Frequency Identification, RFID, circuitry. The method comprise determining the tire location of each tire on the vehicle using image recognition on image data from the camera. Also, the method comprise detecting one or more tire sensors of each tire via the RFID circuitry as the portable electronic device sequentially guides a user of the portable electronic device via a user interface to motion the portable electronic device in proximity of each tire at each determined tire location. Further, the method comprise identifying each of the one or more detected tire sensors on the vehicle.

By having a user of a portable electronic device being guided via a user interface to motion the portable electronic device such that the tire sensors of the tires may be read by the portable electronic device for one specific tire position at a time as the portable electronic device passes in the vicinity of each tire sensor, the tire position of each tire sensor on the vehicle able to be determined. Hence, no manual configuration or additional hardware is required for locating the tire sensors on a vehicle.

In some embodiments, the guidance of the user may be sequential in that the user is guided to each of the determined tire locations in a determined order such that each of the determined tire locations is associated with the one or more tire sensors of each tire at each determined tire location, respectively. Thus, the user may be presented with easy-to-follow directions about the tire position order in which to scan the tire for its tire sensors. In some embodiments, the user may be guided, at each tire location, to motion the portable electronic device in proximity of each tire according to a determined pattern in order to increase the probability of detecting the one or more tire sensors. Thus, the user is also provided with easy-to-follow directions on how to move the portable electronic device about a tire, i.e. how to use the portable electronic device to scan the tire for detection of its tire sensors.

According to some embodiments, the method may comprise transmitting information indicating the identity of each of the one or more detected tire sensors associated with each tire to an Electronic Control Unit, ECU, on-board the vehicle. Thus, the portable electronic device may inform the on-board ECU about the identity of each of the one or more detected tire sensors for a tire at a specific tire position on the vehicle. This is advantageous since it eliminates any possible errors in the ECU settings caused by possible erroneous manual inputs, while also eliminating the need for manual input of the tire sensor/tire position association in the ECU. In some embodiments, the information may be transmitted using WLAN, UWB or Bluetooth wireless communications. Further, in some embodiments, the ECU and the one or more tire sensors on the vehicle may be part of a Tire Pressure Monitor System/Tire Health System, TPMS/THS.

According to a second aspect of embodiments herein, the object is achieved by a portable electronic device for locating tire sensors on a vehicle. The portable electronic device comprises a camera and RFID circuitry. The portable electronic device determines the tire location of each tire on the vehicle using image recognition on image data from the camera. The portable electronic device also detects one or more tire sensors of each tire via the RFID circuitry as the portable electronic device sequentially guides a user of the portable electronic device via a user interface to motion the portable electronic device in proximity of each tire at each determined tire location. Further, the portable electronic device also identifies each of the one or more detected tire sensors on the vehicle.

In some embodiments, the guidance of the user is sequential in that the user is guided to each of the determined tire locations in a determined order such that each of the determined tire locations is associated with the one or more tire sensors of each tire at each determined tire location, respectively. Also, in some embodiments, the user may be guided, at each tire location, to motion the portable electronic device in proximity of each tire according to a determined pattern in order to increase the probability of detecting the one or more tire sensors.

According to some embodiments, the portable electronic device may further be configured to transmit information indicating the identity of each of the one or more detected tire sensors associated with each tire to an Electronic Control Unit, ECU, on-board the vehicle. In this case, according to some embodiments, the information may be transmitted using WLAN, UWB or Bluetooth wireless communications. Also, in some embodiments, the portable electronic device may be a wireless device configured to communicate via wireless telecommunications network, e.g. a cellular or mobile communications device, such as, for example, a smart phone having RFID/NFC functionality and a camera. Further, in some embodiments, the ECU and the one or more tire sensors on the vehicle are part of a Tire Pressure Monitor System/Tire Health System, TPMS/THS.

According to a third aspect of the embodiments herein, the object is achieved by a computer program comprising instructions which, when executed in a processing circuitry, cause the processing circuitry to carry out the method described above. According to a fourth aspect of the embodiments herein, the object is achieved by a carrier containing the computer program described above, wherein the carrier is one of an electronic signal, optical signal, radio signal, or computer-readable storage medium.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
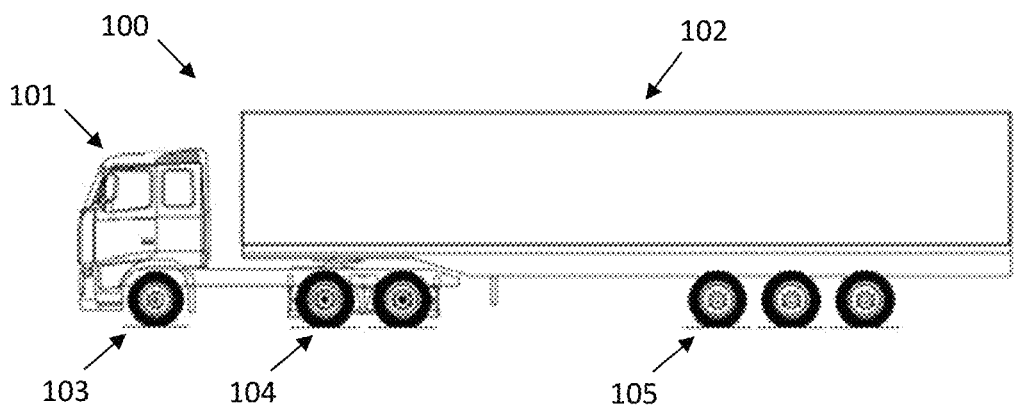
FIG. 1 is a side view of a vehicle with tires.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description. It is to be understood that the present invention is not limited to the embodiments described herein and illustrated in the drawings; rather, the skilled person will recognize that many changes and modifications may be made within the scope of the appended claims.

FIG. 1 illustrates an example of a vehicle 100. In this case, the vehicle 100 is exemplified as a heavy-duty vehicle combination for cargo transport. The vehicle 100 in FIG. 1 comprises a truck or towing vehicle 101 configured to tow a trailer unit 102 in a known manner, e.g., by a fifth wheel connection. The vehicle 100 comprises wheels 103, 104, and 105. Herein, a heavy-duty vehicle is taken to be a vehicle designed for the handling and transport of heavier objects or large quantities of cargo. As an example, a heavy-duty vehicle could be a semi-trailer vehicle, or a truck as described above. As another example, a heavy-duty vehicle could be a vehicle designed for use in construction, mining operations, and the like. It is appreciated that the techniques and devices disclosed herein can be applied together with a wide variety of electrically powered vehicle units, not just those exemplified in FIG. 1. Thus, the techniques disclosed herein are also applicable to, e.g., rigid trucks and also multi-trailer electric heavy-duty vehicles comprising one or more dolly vehicle units.

Thus, even though the embodiments herein for locating tire sensors on a vehicle are described mainly with respect to heavy-duty vehicles, such as, e.g. semi-trailer vehicles or trucks for cargo transport, the embodiments herein should not be considered restricted to this particular type of vehicle but may also be used in other types of vehicles, such as, e.g. a conventional passenger vehicles with four wheels.

Figure 2:
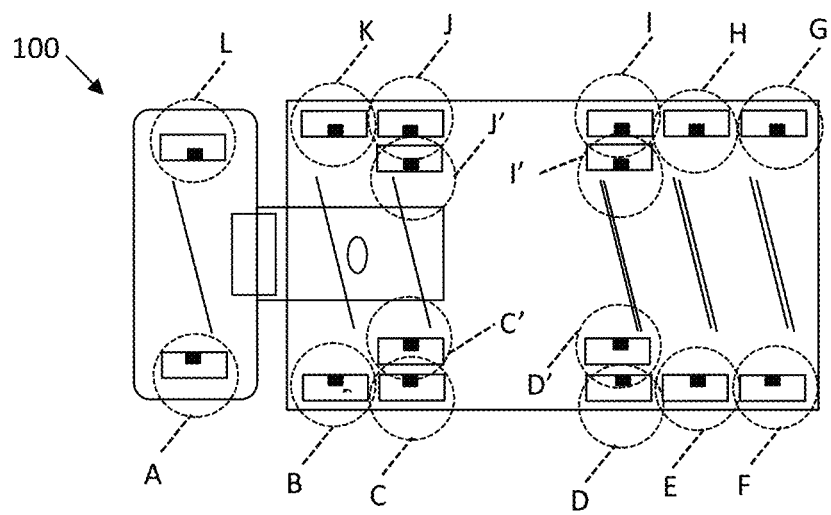
FIG. 2 is a schematic illustration of a vehicle and tire positions.

FIG. 2 illustrates a first top-side view of the vehicle 100 and tire positions A-L thereon. In this example, the tire position A is the front left tire position of the truck or towing vehicle 101 of the vehicle 100, while the tire position L is the front right tire position of the truck or towing vehicle 101 of the vehicle 100. Furthermore, the tire positions of the trailer unit 102 ranges around the trailer unit 102 from the tire position B for the front left tire of the trailer unit 102 to the tire position K of the front right tire of the trailer unit 102. In some cases, certain tire positions may comprise a set of twin wheels as illustrated for the tire positions C, D, I, and J. In this case, the outermost tire position of the set of twin wheels is referred to as C, D, I, and J, respectively, while the innermost tire position of the set of twin wheels is referred to as C', D', I', and J'.

It should also be noted that the notation of the tire positions is merely made for sake of illustrative purposes to provide a clear and concise references to different tire positions; in other words, this notation should not be construed as limiting to the embodiments herein.

Figure 3:
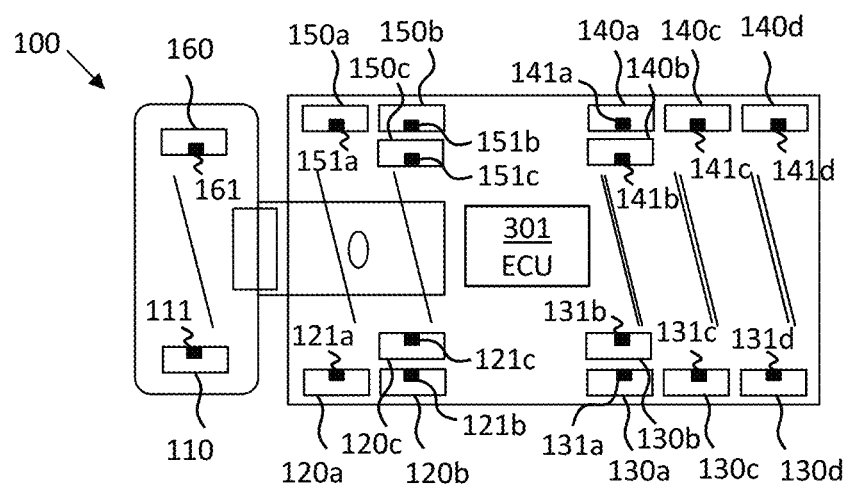
FIG. 3 is a schematic illustrations of a vehicle having tires comprising tire sensors at each tire position.

FIG. 3 illustrates a second top-side view of the vehicle 100 having tires 110, 120, 130, 140, 150, 160 comprising tire sensors 111, 121, 131, 141, 151, 161 at each tire position A-L on the vehicle 100 as described above in FIG. 2. The vehicle 100 further comprise an electronic control unit, ECU 301.

In this example, the tire 110 at the tire position A of the truck or towing vehicle 101 of the vehicle 100 comprise at least one tire sensor 111, while the tire 120 at the tire position L of the truck or towing vehicle 101 of the vehicle 100 comprise at least one tire sensor 121. Similarly, each tire 120a, 120b, 120c at the two front left tire positions B, C, C' of the trailer unit 102 of the vehicle 100 comprise each at least one tire sensor 121a, 121b, 121c, respectively. Also, each tire 130a, 130b, 130c, 130d at the three back left tire positions D, D', E, F of the trailer unit 102 of the vehicle 100 comprise each at least one tire sensor 131a, 131b, 131c, 131d, respectively. Furthermore, each tire 140a, 140b, 140c, 140d at the three back right tire positions I, I', H, G of the trailer unit 102 of the vehicle 100 comprise each at least one tire sensor 141a, 141b, 141c. Lastly, each tire 150a, 150b, 150c at the two front right tire positions K, J, J' of the trailer unit 102 of the vehicle 100 comprise each at least one tire sensor 151a, 151b, 151c.

The ECU 301 and each of the one or more tire sensors 111, 121, 131, 141, 151, 161 on the vehicle 100 may be part of an on-board Tire Pressure Monitor System/Tire Health System, TPMS/THS. In other words, the one or more tire sensors 111, 121, 131, 141, 151, 161 on the vehicle 100 may be TPMS/THS sensors, and the ECU 301 may be a TPMS/THS sensor reader. The one or more tire sensors 111, 121, 131, 141, 151, 161 on the vehicle 100 may also be referred to as TPMS/THS transponders.

Figure 4:
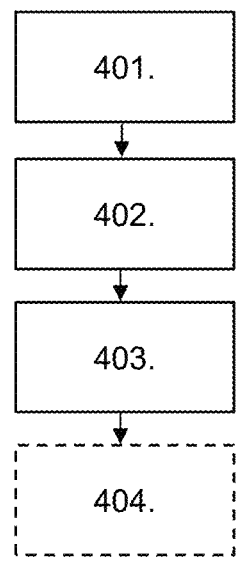
FIG. 4 is a flowchart illustrating embodiments of a method in a portable electronic device.

Examples of embodiments of performed by a portable electronic device 800 for locating tire sensors 111, 121, 131, 141, 151, 161 on a vehicle 100, the portable electronic device 800 comprising a camera 830 and Radio Frequency Identification, RFID, circuitry 840, will now be described with reference to the flowchart depicted in FIG. 4. FIG. 4 is an illustrated example of actions, steps or operations which may be performed by the portable electronic device 800 as described above with reference to FIG. 4. Here, it should also be noted that a user of the portable electronic device 800 may be prompted or instructed via its user interface 850, e.g. by a user application running in the portable electronic device 800, to follow a step-by-step procedure in order for the actions described below to be carried out by the portable electronic device 800. The method may comprise the following actions, steps or operations.

Figure 5:
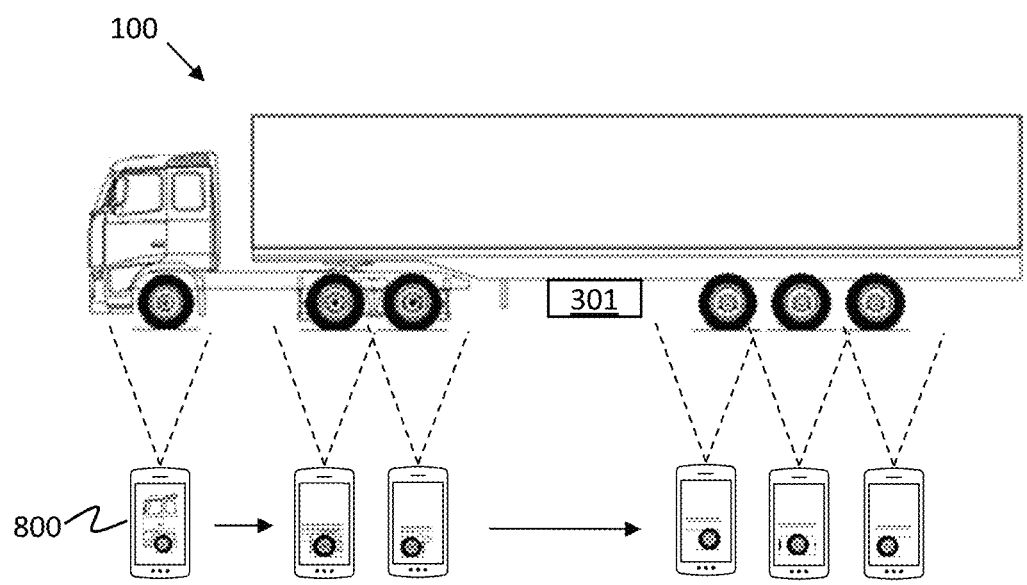
FIG. 5 is a schematic illustrations of tire location determination according to some embodiments.

Action 401. The portable electronic device 800 determines the tire location A-L of each tire 110, 120, 130, 140, 150, 160 on the vehicle 100 using image recognition on image data from the camera 830. This may be initiated by the portable electronic device 800 by, via its user interface 45a, instructing the user of the portable electronic device 800 to walk around the vehicle 100 directing the camera 830 of the portable electric device 800 towards each of the tires of the vehicle 100 while recording camera image data. The image data from the camera 830 may then be used by existing image recognition software in the portable electronic device 800 to detect all of the tires 110, 120, 130, 140, 150, 160 on the vehicle 100. In other words, this means that all of the tires 110, 120, 130, 140, 150, 160 on the vehicle 100 may be optically identified by the portable electronic device 800. This is exemplified and illustrated in FIG. 5. Here, in FIG. 5, only one side of the vehicle 100 is shown, however, the procedure is continued in the same manner on the other side of the vehicle 100 for the remaining tires as well.

Action 402. After the tire location determination in Action 401, the portable electronic device 800 detects one or more tire sensors 111, 121, 131, 141, 151, 161 of each tire 110, 120, 130, 140, 150, 160 via the RFID circuitry 840 as the portable electronic device 800 sequentially guides a user of the portable electronic device 800 via a user interface 850 to motion the portable electronic device 800 in proximity of each tire 110, 120, 130, 140, 150, 160 at each determined tire location A-L. This advantageously means that each tire sensor 111, 121, 131, 141, 151, 161 on the vehicle 100 may be automatically associated with a tire position A-L on the vehicle 100.

Figure 6:
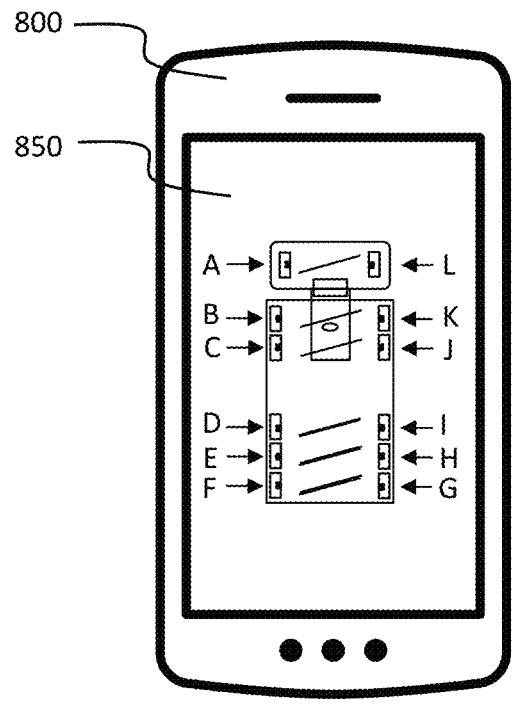
FIG. 6 is a schematic illustrations of a user interface of portable electronic device and guidance of a user there through according to some embodiments.

Here, for example, the guidance of the user is sequential in that the user is guided to each of the determined tire locations A-L in a determined order such that each of the determined tire locations A-L is associated with the one or more tire sensors 111, 121, 131, 141, 151, 161 of each tire 110, 120, 130, 140, 150, 160 at each determined tire location A-L, respectively. This means that an easy-to-follow step-by-step process guides the user of the portable electronic device 800 to approach one specific tire position of the determined tire position A-L at a time. This is exemplified and illustrated in FIG. 6. Here, a specific tire position, e.g. B, among the detected tire positions A-L may be highlighted, e.g. using different graphics or prompted instructions, in the user interface 850 to indicate to the user of the portable electronic device 800 in an easy and simple manner about which tire position, e.g. B, to approach.

According to some embodiments, the user may be guided, at each tire location A-L, to motion the portable electronic device 800 in proximity of each tire 110, 120, 130, 140, 150, 160 according to a determined pattern in order to increase the probability of detecting the one or more tire sensors 111, 121, 131, 141, 151, 161. As the user of the portable electronic device 800 has approached a specific tire position, e.g. B, the user may be prompted and instructed via the user interface 850 to move the portable electronic device 800 in a specific pattern along the tire, e.g. tire 120a at tire location B. For example, an application may e.g. show different graphics or prompt instructions indicating to the user how the move the portable electronic device 800 around the tire. This may be performed in order to be able to locate the one or more tire sensors 111, 121, 131, 141, 151, 161 inside the tire 110, 120, 130, 140, 150, 160, e.g. the tire sensor 121a in the tire 120a at tire location B. For example, as exemplified and illustrated in FIG. 7, an application executing in the portable electronic device 800 may via the user interface 850 prompt the user to move the portable electronic device 800 along the circumference of the tire, e.g. around the circumference of the tire 120a at tire location B. Thus, the portable electronic device 800 may locate the tire sensor 121a, as well as, any further tire sensors in the tire 120a at tire location B, e.g. the tire sensor 121a'.

Action 403. The portable electronic device 800 also identifies each of the one or more detected tire sensors 111, 121, 131, 141, 151, 161 on the vehicle 100. This means, for example, that an RFID/NFC module in the portable electronic device 800 may interrogate the tire sensors 111, 121, 131, 141, 151, 161 in the tires 110, 120, 130, 140, 150, 160, which may respond with their identification information or identity, ID. Thus, by combining the visual information, i.e. the image data, from the camera 830 and the identities, IDs, received from the RFID/NFC tire sensor reading, each identity of each tire sensor 111, 121, 131, 141, 151, 161 may be mapped to a a specific tire position A-L on the vehicle 100.

Action 404. Optionally, the portable electronic device 800 may transmit information indicating the identity of each of the one or more detected tire sensors 111, 121, 131, 141, 151, 161 associated with each tire 110, 120, 130, 140, 150, 160 to an Electronic Control Unit, ECU 301 on-board the vehicle 100. This means that once all of tire sensor 111, 121, 131, 141, 151, 161 are mapped to a tire position A-L, the portable electronic device 800 may inform the ECU 301, e.g. a TPMS/THS system, about the mapping. This may, for example, be performed by prompting the user to approach the ECU 301 and confirm the information transfer of the mapping of each tire sensor 111, 121, 131, 141, 151, 161 to a tire position A-L. This may be performed by wire or wirelessly. In some embodiments, the information may be transmitted using WLAN, UWB or Bluetooth wireless communication. This may be advantageous, for example, in case the ECU 301 is located too far away in the chassis of the vehicle 100 chassis and is difficult to reach. However, it should be noted that the portable electronic device 800 is not limited to in-proximity communications. For example, the portable electronic device 800 may transmit the information via a wired or wireless communications network up to a central server, e.g. a cloud or online server, from which the information later may be transferred to the ECU 301 in the vehicle 100. Also, according to some embodiments, the ECU 301 and the one or more tire sensors 111, 121, 131, 141, 151, 161 on the vehicle 100 are part of a Tire Pressure Monitor System/Tire Health System, TPMS/THS.

It should also be noted tires 110, 120, 130, 140, 150, 160 alone also may have RFID tags or sensors for tire identification that is separate from the tire sensors 111, 121, 131, 141, 151, 161. Here, it should be noted that the portable electronic device 800 may be used also for detecting the identity of the tire, e.g. tire ID. Further, the portable electronic device 800 may be used also for pairing the identity of the tire, e.g. tire ID, with the identity of the tire sensor, e.g. tire sensor ID. Also, in case of having other sensor IDs, such as for example, separate pressure and temperature sensors, the portable electronic device 800 may also be used for pairing these with the tire ID/tire sensor IDs. In other words, the pairing of the different RFID tags or sensors may be performed automatically as the portable electronic device 800 is motioned about each tire 110, 120, 130, 140, 150, 160 as described above.

Figure 8:
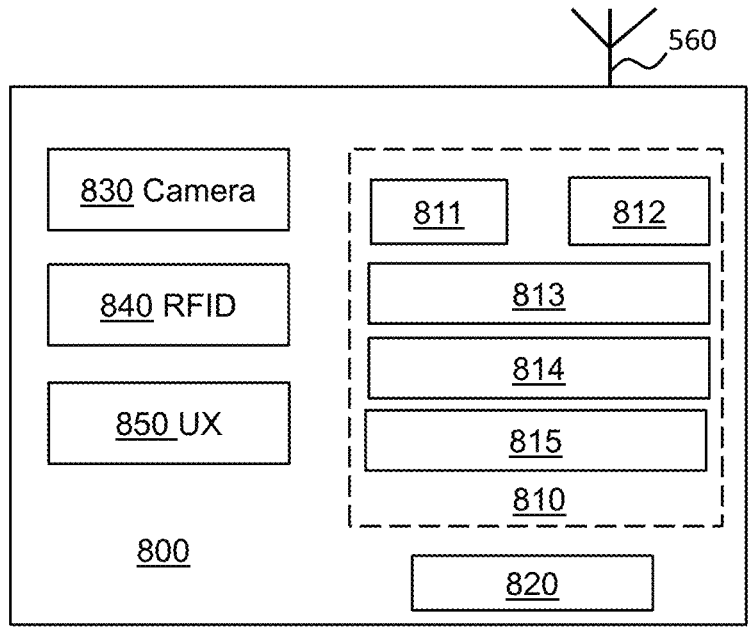
FIG. 8 is a block diagram depicting embodiments of a portable electronic device.

To perform the method actions for locating tire sensors 111, 121, 131, 141, 151, 161 on a vehicle 100, the portable electronic device 800 may comprise the following arrangement depicted in FIG. 8. FIG. 8 shows a schematic block diagram of embodiments of the portable electronic device 800. The portable electronic device 800 comprise a camera 830 and a Radio Frequency Identification, RFID, circuitry 840. Also, the portable electronic device 800 may comprise a user interface, UX 850. It should also be noted that, although not shown in FIG. 8, known conventional features of a portable electronic device 800, such as, for example, a connection to a power source, e.g. a battery or an electric grid, may be assumed to be comprised in the portable electronic device 800 but is not shown or described in any further detail in regards to FIG. 8.

The portable electronic device 800 may comprise processing circuitry 810 and a memory 820. The processing circuitry 810 may also comprise a receiving module 811 and a transmitting module 812. According to some embodiments, the receiving module 811 and the transmitting module 812 may comprise RF circuitry and baseband processing circuitry capable of transmitting and receiving a radio signal in a wireless communications network. The receiving module 811 and the transmitting module 812 may also form part of a single transceiver. This may, for example, be the case when the portable electronic device 800, according to some embodiments, is a wireless device, mobile phone or smart phone configured to communicate via wireless telecommunications network. Optionally, the receiving module 811 and the transmitting module 812 may also be configured to using WLAN, UWB or Bluetooth wireless communications for external wireless communication.

It should also be noted that some or all of the functionality described in the embodiments above as being performed by the portable electronic device 800 may be provided by the processing circuitry 810 executing instructions stored on a computer-readable medium, such as, e.g. the memory 820 shown in FIG. 8. Alternative embodiments of the portable electronic device 800 may comprise additional components, such as, for example, a determining module 813, a detecting module 814, and an identification module 815, whereby each module may be configured and responsible for providing its dedicated functionality to support the embodiments described herein.

The portable electronic device 800 or processing circuitry 810 is configured to, or may comprise the determining module 813 being configured to, determine the tire location (A-L) of each tire 110, 120, 130, 140, 150, 160 on the vehicle 100 using image recognition on image data from the camera 830. Also, the portable electronic device 800 or processing circuitry 810 is configured to, or may comprise the detecting module 814 being configured to, detect one or more tire sensors 111, 121, 131, 141, 151, 161 of each tire 110, 120, 130, 140, 150, 160 via the RFID circuitry 840 as the portable electronic device 800 or processing circuitry 810 sequentially guides a user of the portable electronic device 800 via the user interface UX 850, to motion the portable electronic device 800 in proximity of each tire 110, 120, 130, 140, 150, 160 at each determined tire location A-L. Further, the portable electronic device 800 or processing circuitry 810 is configured to, or may comprise the identification module 815 being configured to, identify each of the one or more detected tire sensors 111, 121, 131, 141, 151, 161 on the vehicle 100.

In some embodiments, the guidance of the user may be sequential in that the user is guided to each of the determined tire locations A-L in a determined order such that each of the determined tire locations A-L is associated with the one or more tire sensors 111, 121, 131, 141, 151, 161 of each tire 110, 120, 130, 140, 150, 160 at each determined tire location A-L, respectively. In some embodiments, the user may be guided, at each tire location A-L, to motion the portable electronic device 800 in proximity of each tire 110, 120, 130, 140, 150, 160 according to a determined pattern in order to increase the probability of detecting the one or more tire sensors 111, 121, 131, 141, 151, 161.

Further, according to some embodiments, the portable electronic device 800 or processing circuitry 810 may be configured to, or may comprise the transmitting module 812 being configured to, transmit information indicating the identity of each of the one or more detected tire sensors 111, 121, 131, 141, 151, 161 associated with each tire 110, 120, 130, 140, 150, 160 to an Electronic Control Unit, ECU 301 on-board the vehicle 100. In some embodiments, the portable electronic device 800 or processing circuitry 810 may be configured to, or may comprise the transmitting module 812 being configured to, transmit the information using WLAN, UWB or Bluetooth wireless communications.

Figure 7:
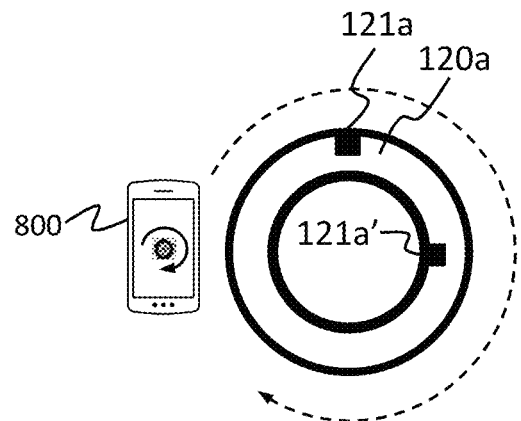
FIG. 7 is a schematic illustrations of movement pattern of the portable electronic device according to some embodiments.

Furthermore, the embodiments for locating tire sensors 111, 121, 131, 141, 151, 161 on a vehicle 100 described above may be at least partly implemented through one or more processors, such as, the processing circuitry 810 in the portable electronic device 800 depicted in FIG. 7, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 810 in the portable electronic device 800. The data carrier, or computer readable medium, may be one of an electronic signal, optical signal, radio signal or computer-readable storage medium. The computer program code may e.g. be provided as pure program code in the portable electronic device 800 or on a server and downloaded to the portable electronic device 800. Thus, it should be noted that the functions of the portable electronic device 800 may in some embodiments be implemented as computer programs stored in memory, e.g. in the computer readable storage unit 820 in FIG. 8, for execution by processors or processing modules, e.g. the processing circuitry 810 in the portable electronic device 800 of FIG. 8.

Those skilled in the art will also appreciate that the processing circuitry 810 and the computer readable storage unit 820 described above may refer to a combination of analog and digital circuits, and/or one or more processors configured with software and/or firmware, e.g. stored in a memory, that when executed by the one or more processors such as the processing circuitry 810 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems and computer program products. It should be appreciated that the example embodiments presented herein may be practiced in any combination with each other. It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures and program modules represent examples of program code for executing steps of the methods disclosed herein. The particular sequence of such executable instructions or associated data structures represents examples of corresponding acts for implementing the functions described in such steps or processes. The embodiments herein are not limited to the above described preferred embodiments. Various alternatives, modifications and equivalents may be used. Therefore, the above embodiments should not be construed as limiting.

The invention claimed is:

1. A method performed by a portable electronic device for locating tire sensors on a vehicle, the portable electronic device comprising a camera and Radio Frequency Identification, RFID, circuitry, wherein the method comprise:
   determining the tire location of each tire on the vehicle using image recognition on image data from the camera;
   detecting one or more tire sensors of each tire via the RFID circuitry as the portable electronic device sequentially guides a user of the portable electronic device via a user interface to motion the portable electronic device in proximity of each tire at each determined tire location; and
   identifying each of the one or more detected tire sensors on the vehicle.

2. The method according to claim 1, wherein the guidance of the user is sequential in that the user is guided to each of the determined tire locations in a determined order such that each of the determined tire locations is associated with the one or more tire sensors of each tire at each determined tire location, respectively.

3. The method according to claim 1, wherein the user is guided, at each tire location, to motion the portable electronic device in proximity of each tire according to a determined pattern in order to increase the probability of detecting the one or more tire sensors.

4. The method according to claim 1, further comprising transmitting information indicating the identity of each of the one or more detected tire sensors associated with each tire to an Electronic Control Unit, ECU on-board the vehicle.

5. The method according to claim 4, wherein the information is transmitted using WLAN, UWB or Bluetooth wireless communications.

6. The method according to claim 1, wherein the ECU and the one or more tire sensors on the vehicle are part of a Tire Pressure Monitor System/Tire Health System, TPMS/THS.

7. A portable electronic device for locating tire sensors on a vehicle, the portable electronic device comprising a camera and Radio Frequency Identification, RFID, circuitry, wherein the portable electronic device is configured to
   determine the tire location of each tire on the vehicle using image recognition on image data from the camera, detect one or more tire sensors of each tire via the RFID circuitry as the portable electronic device sequentially guides a user of the portable electronic device via a user interface to motion the portable electronic device in proximity of each tire at each determined tire location, and identify each of the one or more detected tire sensors on the vehicle.

8. The portable electronic device according to claim 7, wherein the guidance of the user is sequential in that the user is guided to each of the determined tire locations in a determined order such that each of the determined tire locations is associated with the one or more tire sensors of each tire at each determined tire location, respectively.

9. The portable electronic device according to claim 7, wherein the user is guided, at each tire location, to motion the portable electronic device in proximity of each tire according to a determined pattern in order to increase the probability of detecting the one or more tire sensors.

10. The portable electronic device according to claim 7, further configured to transmit information indicating the identity of each of the one or more detected tire sensors associated with each tire to an Electronic Control Unit, ECU on-board the vehicle.

11. The portable electronic device according to claim 10, further configured to transmit the information using WLAN, UWB or Bluetooth wireless communications.

12. The portable electronic device according to claim 7, wherein the portable electronic device is a wireless device configured to communicate via wireless telecommunications network.

13. A non-transitory computer program comprising program code for performing the steps of claim 1 when said program code is run on a computer or on processing circuitry of a portable electronic device.

14. A non-transitory computer program carrier carrying a computer program according to claim 13, wherein the computer program carrier is a computer-readable storage medium.

* * * * *